Figure 1:
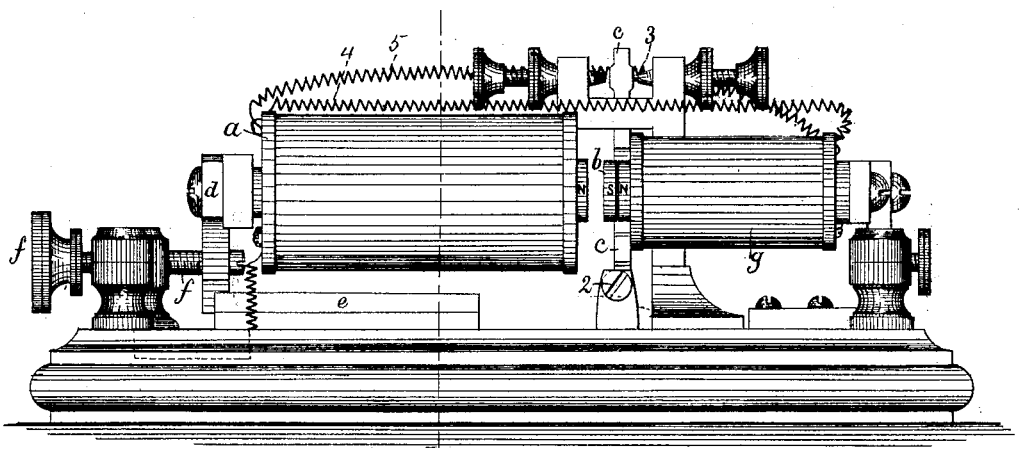

(No Model.)

M. G. CRANE.
ELECTRO MAGNETIC APPARATUS.

No. 244,035. Patented July 12, 1881.

WITNESSES
Arthur Reynolds
W. H. Sigoton

INVENTOR
Moses G. Crane,
by Crosby & Gregory
Attys.

ced by the induced current caused
UNITED STATES PATENT OFFICE.

MOSES G. CRANE, OF NEWTON, MASSACHUSETTS.

ELECTRO-MAGNETIC APPARATUS.

SPECIFICATION forming part of Letters Patent No. 244,035, dated July 12, 1881.

Application filed February 19, 1881. (No model.)

*To all whom it may concern:*

Be it known that I, MOSES G. CRANE, of Newton, county of Middlesex, State of Massachusetts, have invented an Improvement in Electro-Magnetic Apparatus, of which the following description, in connection with the accompanying drawings, is a specification.

My invention is shown in a relay, and has for its object to render it more certain and positive in action than those of common construction, and capable of proper operation with currents of wide range of strength without any adjustment.

In relays as ordinarily constructed the armature is withdrawn from the magnet when demagnetized by a retracting-spring, the force of which in practice has to be adjusted from time to time, as the strength of the magnetizing-current varies under the varying circumstances to which its circuit, source, &c., are exposed. The retracting-spring will cause the armature to be withheld or withdrawn from the magnet when excited by currents below a certain strength, and will be overcome by currents of greater strength. The difference between the maximum strength of current and that which will just be overcome by the retractor at any time constitutes the working margin, and as at some times the maximum current is less than the minimum is at other times it is obvious that the strength of the retractor will have to be adjusted to meet the requirements of the particular case.

My invention is embodied in a relay adapted to withdraw the armature from the poles of the magnet by the influence of an electric current applied just at the moment when the main current is withdrawn. This retracting-current is produced, in accordance with my invention, by a secondary coil wound upon the main relay-magnet, and including in its circuit the helices of a secondary or retracting magnet arranged to act upon the armature in the opposite direction to the main relay-magnet. By this arrangement, when the circuit of the relay is broken or the current therein removed or reduced in strength, there will be a momentary current induced in the secondary coil which will produce an impulse in the retracting-magnet in circuit therewith, and cause it to withdraw the armature from the main magnet.

The secondary or retracting magnet preferably has hardened cores with a certain amount of permanent magnetism of the same polarity as that produced by the induced current caused by breaking the main circuit, such permanent magnetism performing a double function—namely, it serves to retain the armature back or away from the poles of the main magnet after it has been retracted by the momentary impulse; and, secondly, the secondary current produced upon closing the main circuit (which is in opposite direction to that produced by breaking the circuit) will merely neutralize the said magnetism, and cause the retracting magnet to release the armature, instead of producing a new attractive impulse, and momentarily slightly resisting the main relay-magnet, as would be the case if the said retracting-magnet were neutral.

It will be seen that the secondary or retracting current will be proportional to the main actuating-currents, and consequently the working margin or range of current-strength that can be employed without change of adjustment is very great.

I am aware that relays have previously been used in which the armature is actuated by magnets charged by induced currents, and I am also aware that a relay has been previously invented in which the main magnet is wound with a secondary coil, the induced currents in which are employed to polarize the armature of the relay, and thus increase the magnetic effect; but in no apparatus, so far as I am aware, previous to mine have the currents induced in a secondary coil at the breaking of the main circuit been employed to retract the armature from the poles of the main magnet, the coils of which are included in the main circuit like those of an ordinary relay.

Figure 2:
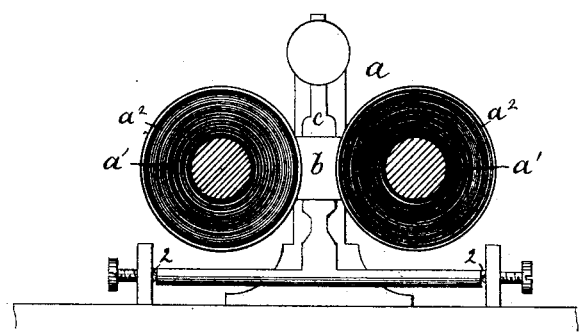

Figure 1 shows, in side elevation, a relay embodying my invention; and Fig. 2, a vertical cross-section thereof through the coils of the induction-coil.

The main relay-magnet *a*, with its primary coil *a'*, to be placed in the main circuit, and the armature *b* on the lever *c*, pivoted at 2 and adapted to open and close a local circuit at the point 3, may be of any usual construction, the said magnet being shown as mounted on a bracket, *d*, adapted to slide in a guide, *e*, and adjusted by the thumb-screw *f* in the usual manner.

The primary coil $a'$ of the magnet $a$ included in the main circuit has wound upon it the secondary coil $a^2$, connected by the wires 4 5 with the helices of the secondary or retracting magnet $g$, forming a closed circuit therewith. The said secondary coil $a^2$ and the helices of the magnet $g$ are preferably connected in such manner that a current passing through the said secondary coil in the same direction with the current in the primary coil $a'$ of the magnet $a$ will produce in the retracting-magnet $g$ magnetism of the same polarity as that of the opposite main magnet $a$, so that the two magnets $a$ and $g$, in alternately attracting the armature $b$, will produce no change of polarity therein, and the said armature may be somewhat hardened, so as to retain a slight amount of permanent magnetism, if desired. The armature $b$ is acted upon by a constant retracting-force, normally tending to draw it away from the poles of the magnet $a$ against its back-stop 3. This retracting-force may be that of a spring, or the armature may be so mounted on its pivot that its own weight will cause it to be retracted from the magnet $a$; or, in the plan which I generally prefer to adopt, the cores of the retracting-magnet $g$ will be provided with a certain amount of permanent magnetism of the polarity excited by the retracting-current induced in the secondary coil of the magnet $a$ by breaking the main circuit of the said magnet.

The operation is as follows: When the main circuit, including the primary coil of the magnet $a$, is closed the said magnet is magnetized, taking, for example, the polarity indicated in the figure, the pole, which is visible, being north, (N.) It will then attract the armature $b$, the pole of which that shows in the drawings either being or becoming of south polarity, as indicated by the letter S. At the same moment that the main circuit is closed a current is induced in the secondary coil, and consequently in the helices of the retracting-magnet $g$, in the opposite direction to the said main current, so that when the magnets $a$ $g$ are arranged as hereinbefore described the tendency of the said current will be to produce south polarity in the visible pole of the magnet $g$, (marked N,) which would repel the armature $b$ if it had any permanent magnetism of the polarity indicated thereon, or would neutralize the permanent magnetism of the cores of the magnet $g$ of the polarity indicated thereon by the letter N, in either case giving a momentary impulse upon the armature $b$ to move it toward the pole of the magnet $a$, thereby assisting the main current therein. If both the armature and the magnet $g$ were neutral, the said induced current would produce a slight attraction between them, which would momentarily oppose the action of the magnet $a$; but as the action of the magnet $a$ is continuous and that of the magnet $g$ momentary, and since the current induced by closing the primary circuit is comparatively weak, the relay would operate if the said armature and magnet $g$ were neutral, though perhaps a trifle more sluggishly. When the main circuit of the magnet $a$ is broken a current is induced in the secondary coil and magnet $g$ in the same direction as the main current of the magnet $a$, and will consequently produce an attractive impulse in the magnet $g$ at the same moment that the magnet $a$ is demagnetized, so that the armature $b$ would be readily withdrawn from the magnet $a$, and, although the impulse thus produced in the retracting-magnet $g$ is only momentary, the said armature will be retained against its back-stop, or away from the poles of the main magnet $a$, by the constant retracting-force before described until the main circuit is again closed, and the operation repeated.

The invention has been described as embodied in a relay; but it only relates to the instrumentalities employed to move an armature, and it is evident that the said armature in its movement may be employed to do any kind of work other than closing a local circuit—such, for instance, as operating as a detent for any kind of machinery or apparatus usually controlled by an electro-magnet and its armature.

It is also obvious that the induction-coil need not be placed upon the cores of the main magnet; but an independent induction-coil may be used, its primary being included in the circuit of the main magnet and its secondary in the circuit of the retracting-magnet.

I claim—

1. The main electro-magnet and induction-coil, the primary coil of which is in the main circuit, combined with the independent retracting-magnet in circuit with the secondary coil of the said induction-coil, whereby a magnetic impulse is produced in the said retracting-magnet when the condition of the main current in the primary coil is changed, substantially as and for the purpose described.

2. The main electro-magnet and its armature and primary and secondary coils on the cores of the said magnet, combined with the independent retracting-magnet in circuit with the said secondary coil, as and for the purpose described.

3. The independent main magnet and primary and secondary coils thereon, combined with the retracting-magnet in circuit with the said secondary coil, and having its cores permanently magnetized, substantially as described, and for the purpose set forth.

4. The main and retracting electro-magnets and armature affected by each of them and the induction-coil, the primary coil of which is included in the same circuit with the said main magnet, and the secondary coil of which is included in the same circuit with said retracting-magnet, substantially as described.

In testimony whereof I have signed my name to this specification in the presence of two subscribing witnesses.

MOSES G. CRANE.

Witnesses:
JOS. P. LIVERMORE,
W. H. SIGSTON.